United States Patent [19]
Straetker

[11] Patent Number: 5,921,335
[45] Date of Patent: Jul. 13, 1999

[54] STEERING CONTROL SYSTEM FOR TRACKED VEHICLE

[75] Inventor: John George Straetker, West Chester, Ohio

[73] Assignee: Deere & Company, Moline, Ill.

[21] Appl. No.: 08/862,166

[22] Filed: May 22, 1997

[51] Int. Cl.⁶ .................................................. B62D 11/04
[52] U.S. Cl. ........................................... 180/6.44; 701/41
[58] Field of Search .................................. 180/6.2, 6.44, 180/6.48, 6.5; 701/41, 42

[56] References Cited

U.S. PATENT DOCUMENTS

| | | | |
|---|---|---|---|
| 4,309,917 | 1/1982 | Leet | 74/861 |
| 4,699,021 | 10/1987 | Waddington | 180/6.44 |
| 5,485,376 | 1/1996 | Oike et al. | 701/41 |
| 5,529,134 | 6/1996 | Yomogita | 180/6.2 |

*Primary Examiner*—Kevin Hurley

[57] ABSTRACT

A steering control system for a tracked vehicle includes a spring centered steering wheel which is rotatable in both directions to endstops. A steering control unit executes a transitional counter-rotation (TCR) mode algorithm which disables steering or counter-rotation when the gear lever moves from park to neutral or from park to neutral to gear while the clutch is disengaged. Steering function can be re-enabled by turning the steering wheel to its centered position and then turning the steering wheel in either direction away from its centered position, or by turning steering wheel towards one of its endstop positions (without centering the steering wheel). If steering or counter-rotating is enabled the second way, then during a transition period the turning rate as a function of the position of the steering wheel will be less than that of normal operation. If the steering wheel is then held at the endstop position, the control system will automatically and gradually increase the rate of turning (by increasing an electronic steering gain value) until full normal turning rate capability is attained.

11 Claims, 6 Drawing Sheets

FIG. 3a

```
1   PARK TO NEUTRAL LOGIC PSEUDOCODE
2   All inputs to this routine calculated above this entry point
3
4   if steer_angle < 4 degrees from center or has transitioned through center
5   then reset the following parameters: in_park_last = 0 and clutch_CR = 0;
6
7   Determine Operating Mode
8   if steering system is operational
9   then allow steering to function as determined by the following logic:
10      if (vehicle speed is <= 1 kph and transmission is commanding PARK)
11      then in PARK MODE and do the following: Reset all normal and CR flags in PARK, don't allow steering
12          Set all associated park mode flags
13          set operational mode to "park mode"
14          park2neutral = 1;         reset flag that indicates a park to neutral transition
15          in_park_last = 1;         reset flag that indicates that you're coming from park
16          clutch_CR = 1;            It is possible to now enter clutch transitional CR
17      else the system is either in normal or Transitional counter rotation mode as determined by the following logic:
18          If coming from park mode or counter rotation has been disabled and clutch is not fully engaged and transmission is in forward or reverse
19          gear and wheel speed is approximately zero,
20          Then allow transitional counter rotation mode.
21              (note that the disabled condition allows the steering to stop as the vehicle stops)
22          OR If wheel speed is approximately zero and the transmission is commanding neutral and either the counter rotation has been disabled or closed loop is
23          the transmission had been commanding park prior to neutral,
24          Then allow transitional counter rotation mode.
25          OR If the operational mode has already been transition counter rotation and the motor speed is greater than zero and closed loop is
26          functioning or the current command to the solenoids is greater than zero and the transmission is commanding neutral,
27          Then allow transitional counter rotation.
28              (note that this condition helps keep the vehicle from toggling between normal and TCR modes during counter rotation when the drive-
29              line may rotate causing wheel speed).
30
31      If none of the above conditions apply, then normal mode is used.
```

FIG. 3b

The following logic is used when the vehicle is in transitional counter rotation mode:
  if counter rotation is enabled (no faults have disabled it) then *Counter Rotation is Allowed* and the following logic applies:
    if (Entering CR 1st time from other mode then do the following:
      Set operational mode to TCR mode
      steer_cmd_rate = 0;        reset offset rate to zero
      if steering wheel is the endstop and there was not a park to neutral transition,
      then allow counter rotation immediately:
        cr_ok=1;
        CRsteer_angle = 0;   Reset steering offset to zero
      else CRsteer_angle = steer_angle; store steering angle for xtra deadband
    Calculate turning speed: using constant CR speed as wheel speed as follows:
      turn_spd = (unsigned long)(min_whl_spd_CR + veh_spd_offset) * nom_engine_spd / engine_spd
                 + veh_spd_adder;
    Calculate maximum endstop ramp rate and gain as follows:
      max_ramp_gain = turn_spd/4+500;
      max_ramp_rate = turn_spd/1600;
    Calculate Steering Command
    if cr_ok flag not set then not yet ready to command a turn and do the following:
      if (steer_angle > CRsteer_angle)
      then
        if (steer_angle > (CRsteer_angle + CR_neutral_deadband) OR
            steer_angle < CR_neutral_deadband)
        then steering angle crossed over CR activation threshold so do the following:
          cr_ok=1;                 It is now OK for CR to occur
          CRsteer_angle = steer_angle;     Set new steering angle offset
      else set at new steering angle offset as follows:
        CRsteer_angle = steer_angle;
        Set steering command to zero

FIG. 3c 60  else TCR is fully enabled, so now calculate steering command
61      if (steer_angle <= CR_neutral_deadband)
62      then steering wheel not greater than special/larger TCR deadband, do the following:
63          CRsteer_angle = steer_angle;                    reset offset to new steer angle
64          steer_cmd_rate = 0;                             reset offset decrement rate
65          steer_cmd = 0;                                  zero steering command
66      else if steering wheel is on endstop then do the following:
67          if TCR was NOT entered from park
68          then set rate at which offset is decreased and offset
69              if (steer_cmd_rate<15) then increase offset rate
70              if (CRsteer_angle>15) then decrease offset at a slow rate */
71              if (steer_angle > CRsteer_angle) then steer_cmd = steer_angle - CRsteer_angle;
72              else set steering command to zero
73      else TCR was entered from park; don't allow steering on endstop
74      else if steering wheel turned past the offset, then do the following
75          steer_cmd = steer_angle - CRsteer_angle;
76          slowly reset steer_cmd_rate by decrementing until zero
77      else steering wheel not around center and not past offset so do the following:
78          CRsteer_angle = steer_angle;                    reset steering angle offset
79          steer_cmd=0;                                    zero steering command
80          steer_cmd_rate = 0;                             reset rate
81  else *Counter Rotation Is NOT Allowed*
82      op mode remains at previously set opmode
83      Sets steering gain ... pump cmd... etc... to 0
84  ELSE NORMAL STEERING MODE: clear all park mode flags or CR flags, etc... turn spd = ((veh spd + offset * nominal engine speed) /engine speed) + adder
85  ELSE DISABLE STEERING MODE    : turn off steering/No Steering Allowed

FIG. 3d

ENDSTOP RAMP PSEUDOCODE

```
86
87  Add end point number top overall gain term to set basic gain number as follows:
88  NLPoint 2 = K * turnspd + end point
89
90  if (steering wheel is approximately on the endstop and counter rotation is allowed,
91  then do the following endstop ramp logic
92    if (calculated steering gain is less than the max_ramp_gain,
93    then do the following:
94      if (if the ramp rate is less than the maximum limit then increase rate.
95
96      if the calculated steering gain and end_point are less than their limits, then continue to ramp
97      else stop ramping and slowly decrement the ramp value (end_point)
98
99    if (steering gain is greater than the maximum gain and end_point is greater than zero,
100   then do the following:
101     end_point--;   decrease maximum ramp level
102     if (end_slew) end_slew--;  decrease ramp rate
103   else steering wheel is not on endstop
104   so reset ramp as follows:
105     Reset ramp slowly if been on endstop and ramping occurred as follows:
106     if (end_point > 11 && steer_angle_chg) end_point = end_point - steer_gain/200;
107     Reset endstop ramp rate
108     end_slew = reset_slew_rate;
109
110   if (steering wheel is about at center then reset end_point)
111
112 Core Steering Gain Curve Calculations:
113 steering gain = (((unsigned long)steer_cmd*(((
114                  (unsigned long)steer_cmd*(255 - shape_coeff))/SWpoint2)
115                  + shape_coeff)/255)*NLpoint2)/2048;
116
117 Calculate Pump Command:
118 pump_cmd = steer_gain*steer_dir;
119
120 Modify commanded direction based on VEHICLE DIRECTION:
121 if (veh_dir == reverse) pump_cmd = -pump_cmd;
```

STEERING CONTROL SYSTEM FOR TRACKED VEHICLE

BACKGROUND OF THE INVENTION

The invention relates to a steering control system for a tracked vehicle.

A tracked vehicle steering system is described in U.S. patent application Ser. No. 08/795,091, filed Feb. 5, 1997 and assigned to the assignee of this application. In this system a gear lever is movable between park, neutral and forward and reverse gear positions. The steering wheel is spring centered and is turnable in either direction to endstop positions. There is also an electronic steering wheel position sensor which generates an absolute steering wheel position signal. A microprocessor-based control unit controls vehicle steering as a function of the sensed steering wheel position, the gear lever position and other inputs. Such a tracked vehicle is intended to turn, or counter-rotate, without having any forward or reverse velocity. Also in this system the steering function is disabled electronically when the gear lever is in the park position and the vehicle is stationary. It would be undesirable for the vehicle to begin to turn immediately upon moving the gear lever from park to neutral or from park to neutral to gear with the transmission clutch disengaged if the steering wheel is not in its spring centered position. In addition, it would be undesirable to require the operator to simply re-center the steering wheel before steering is enabled. Yet, it is desirable to permit steering to function while the gear lever is in neutral or in gear when the vehicle is stationary. Thus, it is desirable to provide a tracked vehicle steering system disables steering during movement of the gear lever from park to neutral or from park to neutral to gear regardless of steering wheel position, but give an operator full turning capability without having to re-center the steering wheel.

SUMMARY OF THE INVENTION

Accordingly, an object of this invention is to provide a tracked vehicle steering control system which disables steering or counter-rotation during movement of the gear lever from park to neutral or from park to neutral to gear regardless of steering wheel position.

A further object of the invention is to provide such a system which disables steering or counter-rotation as described above, but which allows an operator to re-enable steering or counter-rotation capability without having to re-center the steering wheel.

These and other objects are achieved by the present invention, wherein the control unit executes a transitional counter-rotation (TCR) mode algorithm when the gear lever moves from park to neutral or from park to neutral to gear while the clutch is disengaged. When this TCR mode is operational steering can occur in two ways:

1. By turning the steering wheel to its centered position and then turning the steering wheel in either direction away from its centered position, or
2. By turning steering wheel towards one of its endstop positions (without centering the steering wheel).

If steering or counter-rotating is enabled the first way, control system steers in the normal manner, that is, the turning rate as a function of the position of the steering wheel is the same as during normal operation.

If steering or counter-rotating is enabled the second way, then during a transition period the turning rate as a function of the position of the steering wheel will be less than that of normal operation. If the steering wheel is turned all the way to the endstop position the control system will automatically and gradually increase the rate of turning (by increasing an electronic steering gain value) until full normal turning rate capability is attained.

If the steering wheel is rotated off of the endstop, the gain value will stop increasing and the resulting steering gain value is used as the new steering gain. This steering gain value is gradually reset to the nominal level as the steering wheel returns to the center position. At the center position, if steering gain is not yet at its nominal value, it will be reset to its nominal value. The endstop rate of increase of the steering gain value is proportional to the ratio of drive-line speed to engine speed. In the case of stationary counter-rotation, drive-line speed is set to a constant which is greater than zero.

BRIEF DESCRIPTION OF THE DRAWINGS

FIGS. 3A–3D contain a pseudocode description of transitional counter-rotation (TCR) mode algorithm which is executed by a microprocessor of the control system of FIG. 1 when the gear lever moves from park to neutral or from park to neutral to gear while the clutch is disengaged.

DETAILED DESCRIPTION

Figure 1:
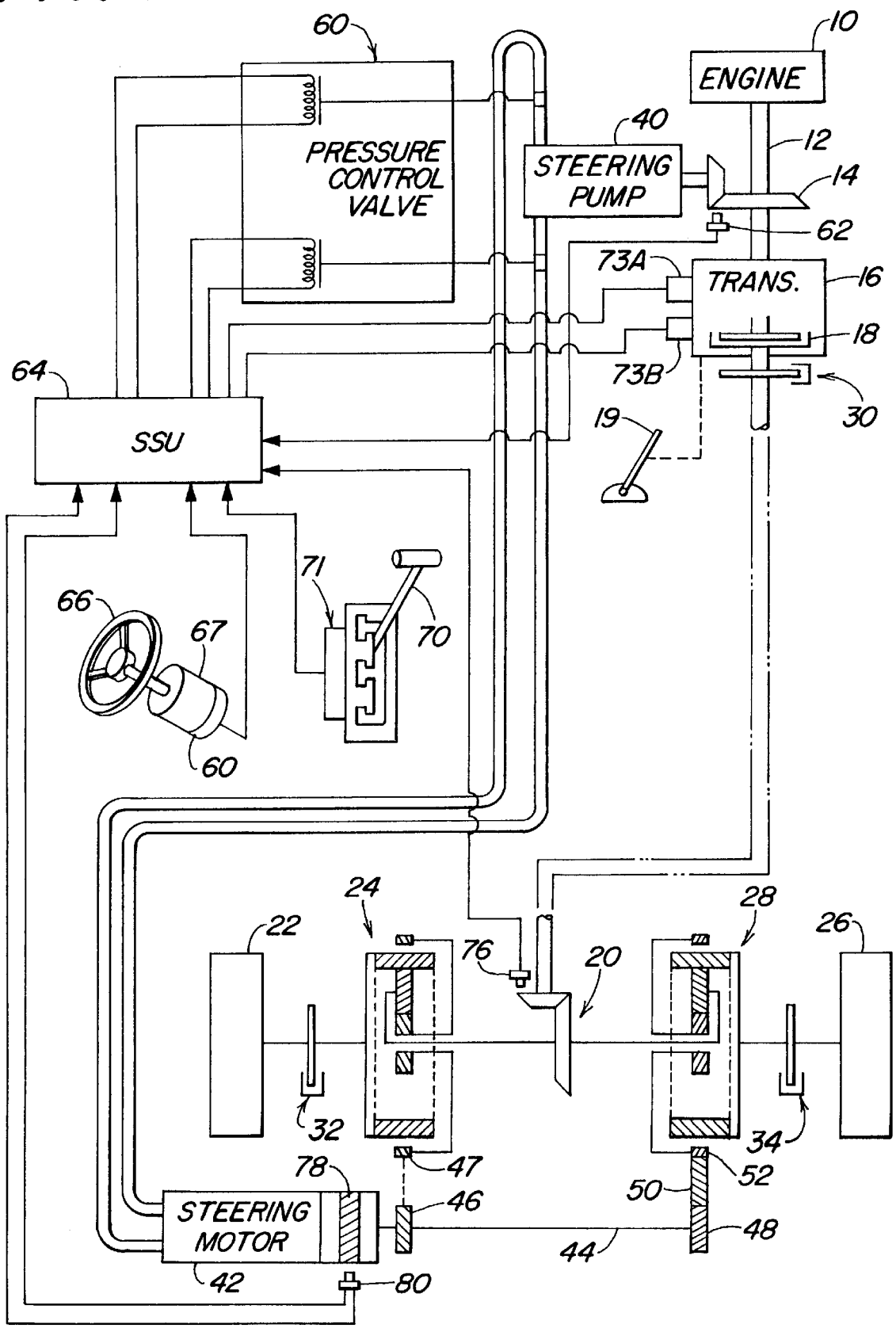
FIG. 1 is a simplified schematic diagram of a tracked vehicle drive and the control system of the present invention.

Referring to FIG. 1, a drive train of a tracked vehicle includes an engine 10 with an output shaft 12 which drives a right angle gear 14 and a transmission 16, such as the transmission which is used on production John Deere 8000 tractors. The transmission 16 includes on its output end a spring released, pressure engaged clutch 18 which is operated by a clutch pedal 19. The transmission out put drives, via final or right angle drive 20, a left track drive wheel 22 via left steering planetary drive 24, and a right track drive wheel 26 via right steering planetary drive 28. The steering planetary drives 24 and 28 are preferably such as described in U.S. Pat. No. 5,390,751, issued Feb. 21, 1995 to Puetz et al., and assigned to the assignee of this application. Additional outboard planetaries (not shown), as provided on John Deere 8000 tractors, are mounted between the steering planetaries and the respective drive wheels, but are not further described because they are not involved in the steering control function which is the subject matter of this application. A parking brake 30 is coupled to the output of clutch 18, and left and right service brakes 32, 34 are coupled to the left and right drive wheels 22, 26, respectively.

The right angle gear 14 drives a variable displacement steering pump 40, such as a 75 cc, 90 series pump made by Sauer-Sundstrand. The pump 40, in turn, powers a hydraulic fixed displacement steering motor 42, such as a 75 cc, 90 series motor, also made by Sauer-Sundstrand. The steering motor 42 drives, via a cross shaft 44 and gear 46, a ring gear 47 of left planetary drive 24, and via cross shaft 44, gear 48 and reverser gear 50, a ring gear 52 of right planetary drive 24.

The swashplate (not shown) of steering pump 40 is controlled by a pressure controlled pilot valve or electronic displacement control (EDC) 60. The EDC is preferably a known two stage device with first stage including a flapper type valve and a second stage including a boost stage to the pump, such as is commercially available from Sauer-Sundstrand with minor modifications to the spool for cold weather and without a manual override function.

A rotation speed sensor 62, such as a commercially available mag pickup, mounted in proximity to the right angle drive 14, provides an engine speed signal to a steering system unit (SSU) 64. The solenoids of valve 60 are controlled by pump command signals (pump_cmd) signals generated by SSU 64.

A steering wheel 66 is connected to a spring centering endstop mechanism 67 and to a rotary position transducer 68, such as a rotary potentiometer, which provides to SSU 64 a steering angle signal (steer_angle) representing the position, relative to its centered position, of the steering wheel 66.

A known shift lever/transducer assembly includes a shift or gear lever 70 which is movable to neutral, park and forward and reverse gear positions, and a shift lever transducer 71 which provides signals representing the position of shift lever 70 to the SSU 64. The shift lever/transducer assembly is more fully described in U.S. Pat. No. 5,406,860, issued Apr. 18, 1995 to Easton et al.

A clutch engagement switch 73A is a pressure switch located in the transmission 16 and senses when the clutch 18 is engaged. Pressure switch 73A provides a clutch engagement signal to the SSU 64. A clutch disengagement sensor switch 73B, is also mounted in the transmission and is linked to the clutch pedal 19, provides a clutch disengagement signal to the SSU 64.

A drive line rotation speed sensor 76, preferably a differential Hall-effect speed sensor such as used on production John Deere tractors, is mounted in proximity to the final drive 20, provides to the SSU 64 a final drive speed, vehicle or wheel speed signal (whl_spd). A magnetic ring 78 is mounted for rotation with the motor 42, and a Hall-effect transducer 80 mounted near the magnetic ring 78 provides to the SSU 64 a motor speed signal and a motor direction signal.

Figure 2:
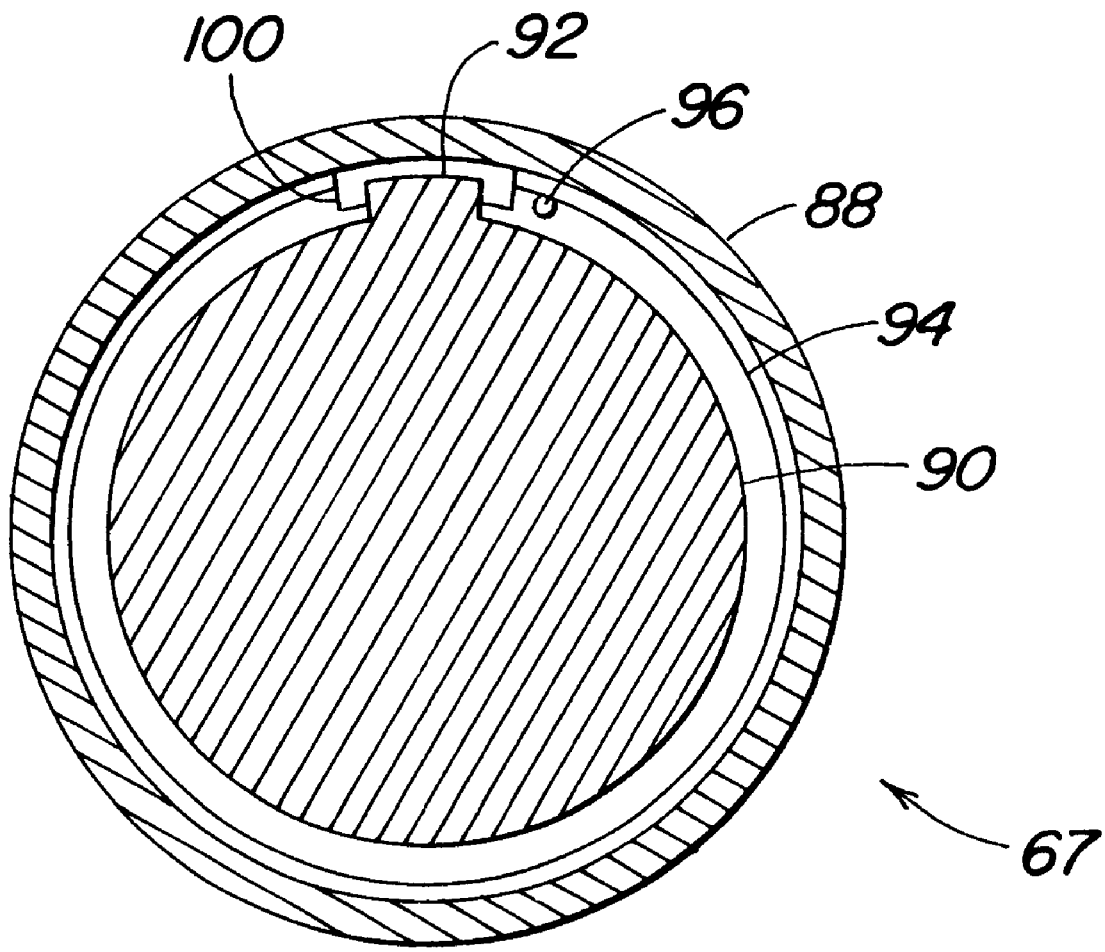
FIG. 2 is a simplified sectional view of a steering wheel centering endstop mechanism which may be used in connection with the control system of FIG. 1.

Referring now to FIG. 2, the centering endstop mechanism 67 includes a shaft 90 rotatably in a fixed housing 88 and coupled to the steering wheel 66. A lug 92 projects from the shaft 90. A ring 94 is rotatable on the shaft 90. A pin 96 projects axially from the ring 94. An endstop tab 100 projects radially inwardly from the housing 88. A torsional spring (not shown) is coupled between the shaft 90 and the housing 88 so that the shaft will return to a centered position. As the shaft 90 is rotated clockwise, the lug 92 will engage pin 96, whereupon ring 94 will rotate with shaft 90 until pin 96 engages endstop tab 100, whereupon further rotation is prevented. The lug 92, pin 96 and endstop tab 100 are preferably dimensioned so that the shaft 90 and the steering wheel 66 are capable of turning through a total angular range of 580 degrees, 290 degrees counterclockwise from center and 290 degrees clockwise from center.

The SSU 64 preferably includes a commercially available microprocessor (not shown) which executes a main loop algorithm (not shown), a program listing for which is contained in the microfiche appendix to previously mentioned U.S. patent application Ser. No. 08/795,091, which is incorporated by reference herein. Referring now to FIGS. 3A–3D, the SSU 64 executes a transitional counter-rotation (TCR) mode algorithm when the gear lever 70 moves from park to neutral or from park to neutral to gear while the clutch 18 is disengaged. The following description will make reference to line numbers of the pseudocode listing of FIGS. 3A–3D.

The algorithm of FIGS. 3A–3D disables turning of the vehicle when the shift lever 70 is moved out of the park position while the clutch 18 is disengaged and the steering member 66 is at a first non-centered displaced position. The algorithm, after disabling of turning, enables turning of the vehicle if the steering member 66 is rotated to its centered position and then rotated away from its centered position. The algorithm, after disabling of turning, also enables turning of the vehicle in response to rotation of the steering member 66 towards one of its endstop positions to a second non-centered displaced position.

The algorithm includes a normal mode (line 31) which is operable during normal vehicle operation to generate the steering control signal so that a turning rate of the vehicle is a first function of the position of the steering member 66. The algorithm also includes a transition mode (lines 18–30, 32–83, 60–80, 86–111) which is operable while the steering member 66 is at the second displaced position to generate the steering control signal so that a turning rate of the vehicle is less than the turning rate for the same steering wheel position during normal operation. Lines 46, 47 and 66–72 operate so that the transition mode operates such that an initial transition turning rate which is effective upon initial enablement of vehicle turning is less than a normal turning rate which is effective when the steering member 66 is at the same position during normal operation.

If, during operation of the transition mode, the steering member 66 is held at its endstop position, lines 88–111 cause the vehicle turning rate to gradually increase. As a result of lines 84, 89 and 114, the transition mode turning rate increases at a rate which is proportional to a ratio of drive speed to engine speed. Lines 74–76 and 114 operate so that if the steering member 66 is rotated away from its endstop position, the vehicle turning rate will stop increasing and the resulting steering gain value is used as the new steering gain. Lines 74–76 operate so that the turning rate gradually returns to the rate effective during normal operation as the steering member 66 returns to its center position. Line 43 operates so that when the vehicle is stationary, the vehicle turning rate increases at a rate which is proportional to a ratio of a constant to engine speed.

A portion of the disclosure of this patent document contains material which is subject to a claim of copyright protection. The copyright owner has no objection to the facsimile reproduction by anyone of the patent document or the patent disclosure, as it appears in the Patent and Trademark Office patent file or records, but otherwise reserves all other rights whatsoever.

While the present invention has been described in conjunction with a specific embodiment, it is understood that many alternatives, modifications and variations will be apparent to those skilled in the art in light of the foregoing description. Accordingly, this invention is intended to embrace all such alternatives, modifications and variations which fall within the spirit and scope of the appended claims.

What is claimed is:

1. A steering control system for a tracked vehicle having an operator manipulated steering member, having a transmission driven by an engine via a clutch, having a shift lever movable among park, neutral and gear positions, having a control unit for generating a steering control signal as a function of a position of the steering member, and having left and right tracks driven by a differential drive mechanism which is responsive to the steering control signal, characterized by:

a clutch disengagement sensor for generating a disengagement signal when the clutch is disengaged;

a shift lever sensor for generating shift lever signals representing the position of the shift lever;

a rotary position sensor coupled to the steering member and generating a steering signal representing a position of the steering member; and the control unit comprises means for generating the steering control signal as a function of the disengagement signal, the shift lever signals and the steering signal, and comprising means for disabling turning of the vehicle when the shift lever is moved out of the park position while the clutch is disengaged and the steering member is at a first non-centered displaced position.

2. The steering control system of claim 1, wherein the control unit comprises:

means operative after disabling of turning to enable turning of the vehicle if the steering member is rotated to its centered position and then rotated away from its centered position.

3. The steering control system of claim 1, wherein the control unit comprises:

means operative after disabling of turning to enable turning of the vehicle in response to rotation of the steering member towards one of its endstop positions to a second non-centered displaced position.

4. The steering control system of claim 3, wherein the control unit comprises:

normal mode means operable during normal vehicle operation to generate the steering control signal so that a turning rate of the vehicle is a first function of the position of the steering member; and transition mode means operable while the steering member is at said second displaced position to generate the steering control signal so that a turning rate of the vehicle is a second function of the position of the steering member, different from said first function.

5. The steering control system of claim 4, wherein the transition mode means comprises:

means operable such that an initial transition turning rate which is effective upon initial enablement of vehicle turning is less than a normal turning rate which is effective when the steering member is at said second displaced position during operation of the normal mode means.

6. The steering control system of claim 4, wherein the transition mode means comprises:

means operable such that an initial transition turning rate which is effective upon initial enablement of vehicle turning is less than a normal turning rate which is effective when the steering member is at its endstop position during operation of the normal mode means; and means operable to gradually increase the vehicle turning rate while the steering member is held at its endstop position during operation of the transition mode means.

7. The steering control system of claim 6, wherein the transition mode means comprises:

means operable such that an initial transition turning rate which is effective upon initial enablement of vehicle turning is less than a normal turning rate which is effective when the steering member is at its endstop position during operation of the normal mode means; and means operable to gradually increase the vehicle turning rate while the steering member is held at its endstop position during operation of the transition mode means.

8. The steering control system of claim 7, further comprising:

a drive speed sensor for sensing a drive speed of an input to the differential drive mechanism;

an engine speed sensor for sensing a speed of the engine; and the transition mode means comprises means for increasing the vehicle turning rate at a rate which is proportional to a ratio of drive speed to engine speed.

9. The steering control system of claim 7, wherein the transition mode means comprises:

means operable such that if the steering member is rotated away from its endstop position, the vehicle turning rate will stop increasing and the resulting steering gain value is used as the new steering gain.

10. The steering control system of claim 9, wherein the transition mode means further comprises:

means operable such to gradually return the vehicle turning rate to the rate effective during operation of the normal mode means as the steering member returns to its center position.

11. The steering control system of claim 7, further comprising:

an engine speed sensor for sensing a speed of the engine; and the transition mode means comprises means operable when the vehicle is stationary for increasing the vehicle turning rate at a rate which is proportional to a ratio of a constant to engine speed.

* * * * *